Figure 1:
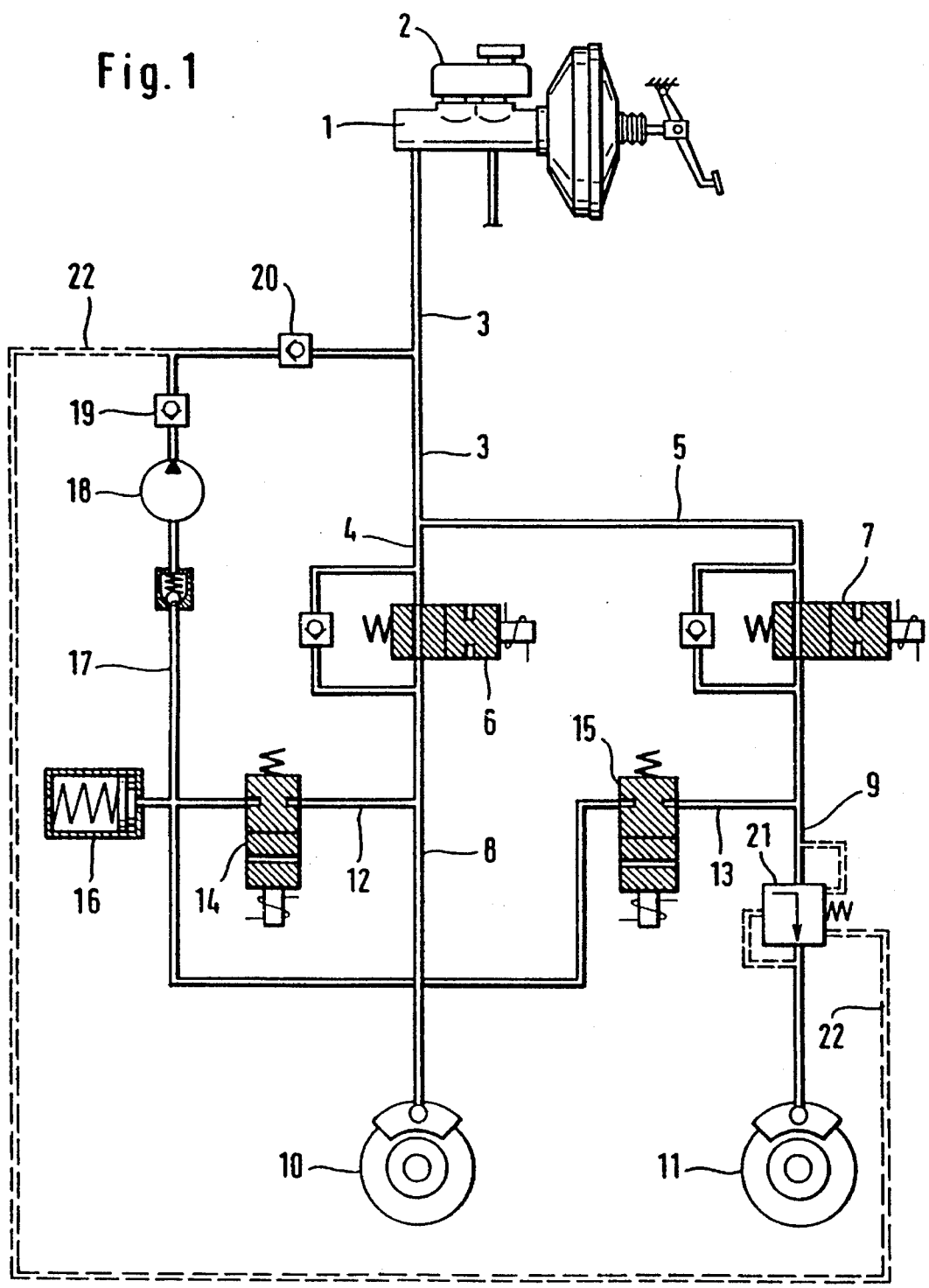

United States Patent [19]

Beck et al.

[11] Patent Number: 5,540,487
[45] Date of Patent: Jul. 30, 1996

[54] ANTI-LOCKING HYDRAULIC BRAKE SYSTEM COMPRISING A BRAKE FORCE CONTROLLER

[75] Inventors: Erhard Beck, Weilburg; Hans-Dieter Reinartz, Frankfurt am Main; Peter Volz, Darmstadt, all of Germany

[73] Assignee: ITT Automotive Europe GmbH, Germany

[21] Appl. No.: 373,310
[22] PCT Filed: Jul. 13, 1993
[86] PCT No.: PCT/EP93/01834

§ 371 Date: Feb. 16, 1995

§ 102(e) Date: Feb. 16, 1995

[87] PCT Pub. No.: WO94/02340

PCT Pub. Date: Feb. 3, 1994

[30] Foreign Application Priority Data

Jul. 21, 1992 [DE] Germany .......................... 42 24 007.7

[51] Int. Cl.⁶ ...................................................... B60T 8/26
[52] U.S. Cl. ................ 303/116.1; 303/84.2; 303/DIG. 2
[58] Field of Search ............................. 303/10.11, 116.1, 303/116.2, 113.1, 113.5, 84.2, DIG. 1, DIG. 2, 9.62, 9.63

[56] References Cited

U.S. PATENT DOCUMENTS

| 4,898,430 | 2/1990 | Becker-Endrigkeit et al. | ........ 303/84.2 |
| 4,969,697 | 11/1990 | Lindenmann | .......................... 303/116.1 |
| 5,209,552 | 5/1993 | Reinartz et al. | ...................... 303/116.1 |

FOREIGN PATENT DOCUMENTS 3742173 6/1989 Germany .

*Primary Examiner*—Matthew C. Graham
*Attorney, Agent, or Firm*—J. Gordon Lewis; Thomas N. Twomey

[57] ABSTRACT

Following a general trend, the present invention provides an anti-locking hydraulic brake system to which a brake force controller has been added. However, as opposed to the prior state of art, the brake force controller (21) according to the invention is blocked only once the pump (18) builds up pressure. This means that in any uncritical deceleration, the brake force controller (21) performs its pressure reducing function as soon as the switch-over pressure thereof is attained. This will involve the advantage over other brake force controls actuated only upon failure of the anti-locking function that jamming or seizing of operative elements of the controller is prevented from occurring and that, in addition, a slip control will be required less frequently.

4 Claims, 3 Drawing Sheets

ANTI-LOCKING HYDRAULIC BRAKE SYSTEM COMPRISING A BRAKE FORCE CONTROLLER

The present invention is concerned with an anti-locking hydraulic brake system comprising a brake force controller, of the type as set out in the preamble portion of the main claim.

A variety of brake systems of the afore-mentioned type are widely known in the art. For example, DE-37 42 173 describes an anti-locking brake system which has mounted in the rear axle brake circuit a brake force controller which, with the aid of an electromagnetic blocking device, is rendered inoperative as long as the anti-locking means is performing its function. However, should a defective condition occur on the anti-locking device, the blocking means would be released, thereby causing the brake force controller to assume its pressure reducing function in each decelerating step. This will insure that also upon failure of the electronic brake pressure control the rear wheels will be prevented from locking before the front wheels in the event of a pedal deceleration, thereby attaining over brake systems having no brake force reducer enhanced driving stability in case of a failure of the anti-locking function, involving, however, the disadvantage that additional electrical conduits and control signals arerequired to insure the function of the brake force controller. Moreover, consideration should be given to the fact that a failure of the anti-locking function constitutes an exceptional condition and tha actuation of the brake force controller should, if possible, never be needed. If a defective condition does occur in years, the brake force controller may become unserviceable having got stuck in a blocked position due to contamination or jamming.

It is, therefore, the object of the present invention to provide a brake system of the afore-mentioned type requiring no additional electronic elements for the brake force controller and insuring in case of a failure, through the brake force controller, even after a long-standing service, a pressure reduction.

This problem, in the practice of the invention, is solved by the characterizing features or the main calm. Hence, according to the principle underlying the invention the brake force controller starts to perform its pressure reducing function in each uncritical deceleration step once the switch-over pressure is exceeded, and continues to operate as long as the brake slip values are within the non-critical range. However, once an excessive brake slip is determined causing commencement of the anti-locking function of the brake system the brake force controller, through a blocking device, is rendered inoperative, thereby initiating the electronically controlled brake pressure control. Actuation ot the blocking device by the pump outlet pressure will eliminate the need to provide an additional electrical feed-in conduit and corresponding electronic signals.

By mounting the brake force controller directly on the wheel brake into the circuit, a conventional valve block can be readily used without requiring any additional modifications. The brake force controller can be mounted on the wheel brake.

Assembly will be easier if the brake force control is designed as a screw-in control involving minor space requirements only.

Figure 2:
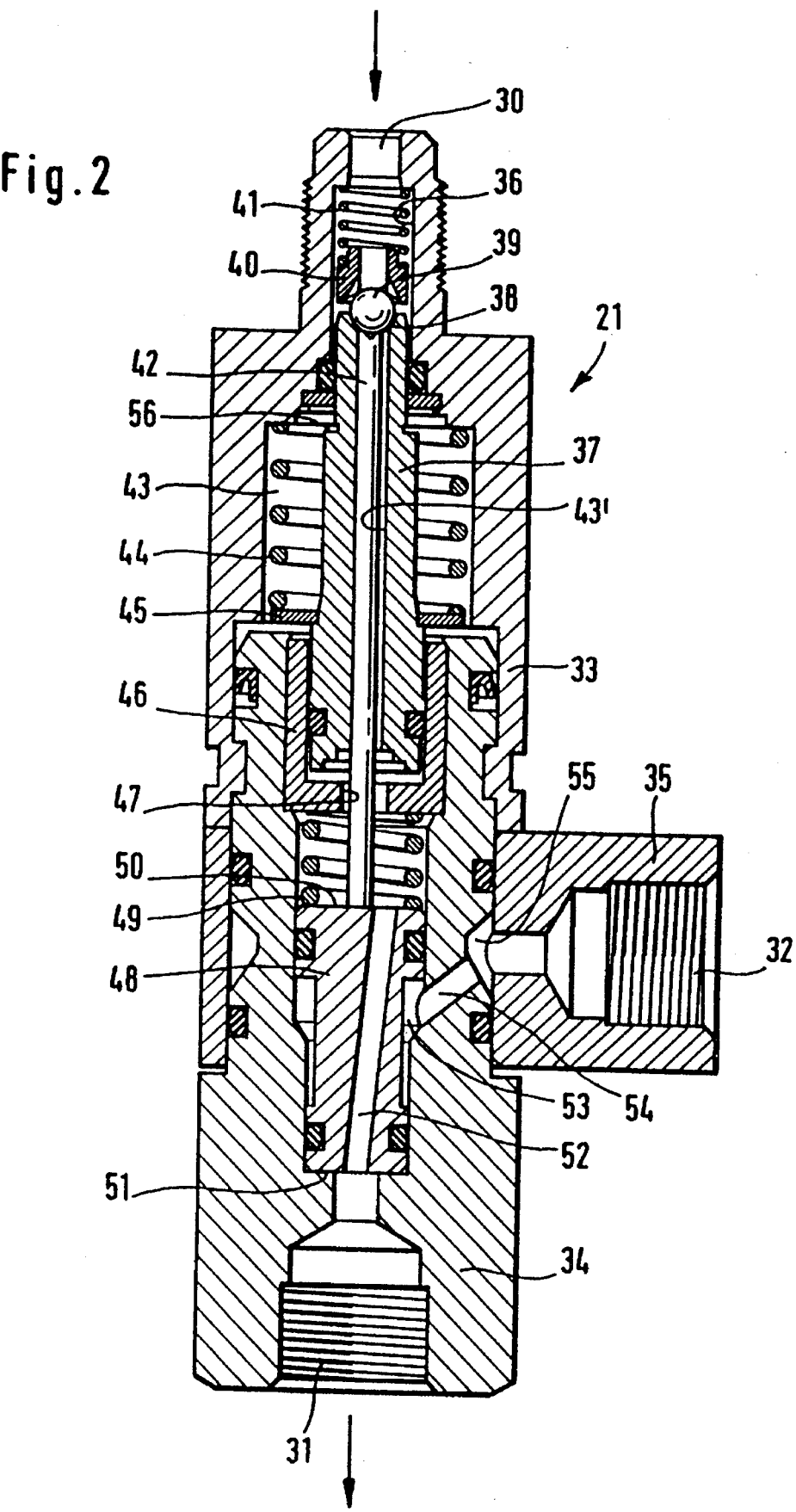
Figure 3:
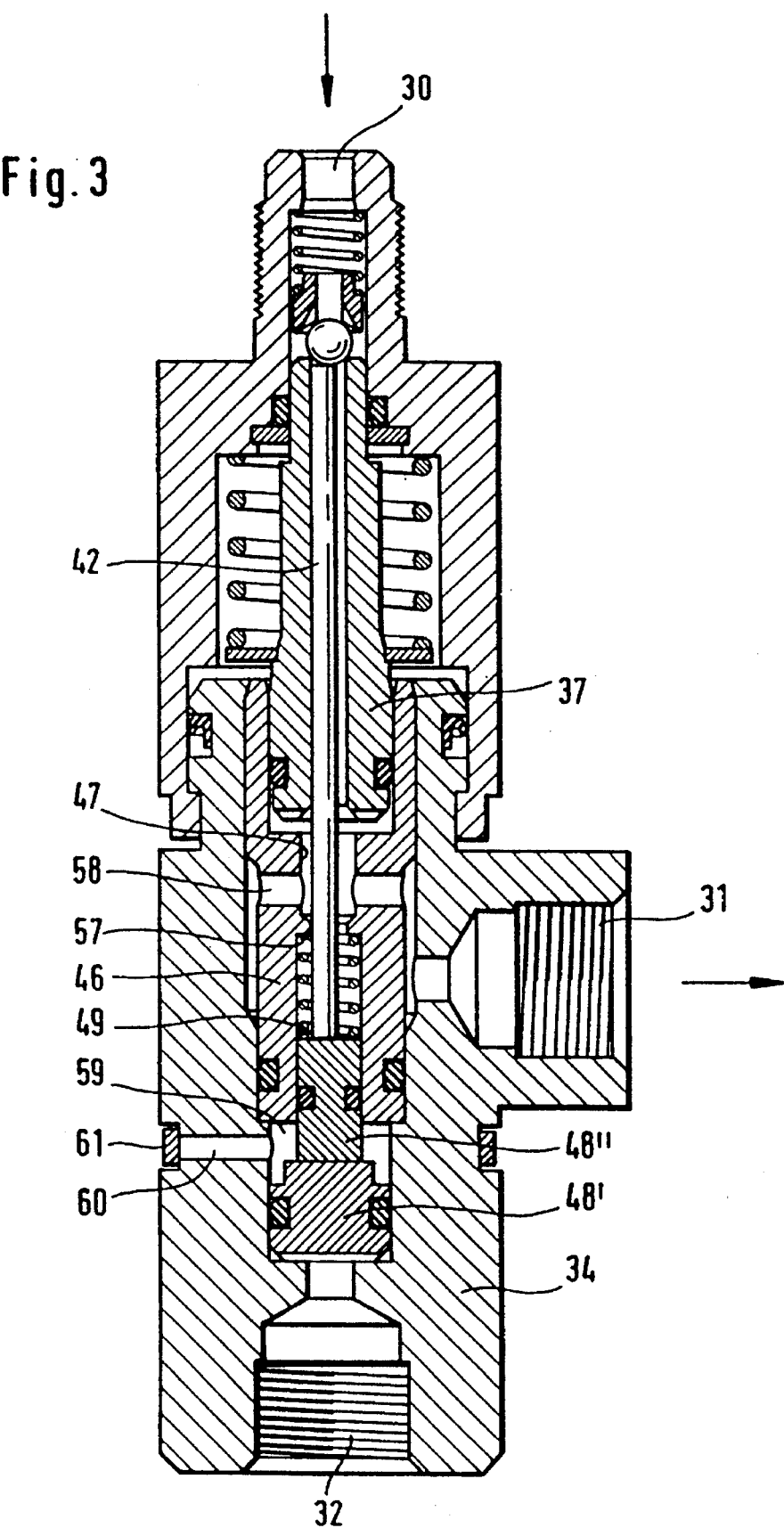

Additional advantageous features will become manifest from the following description of three drawings, wherein:

FIG. 1 shows a brake system of the invention;
FIG. 2 shows a brake force controller provided for a brake system accoruing to the invention;
FIG. 3 shows another form of embodiment of a suitable brake force controller.

The brake system of FIG. 1 operates on the reflux principle. The brake circuit division is of a diagonal configuration resulting in an identical design of brake circuits I and II. For this reason, only brake circuit II is shown herein for purposes of illustration.

In a pedal-actuated deceleration, the main brake conduit 3 is pressurized by the master brake cylinder 1 in communication with the pressure fluid reservoir 2. Such a pressure propagates in the branch brake conduits 4 and 5 and the supply lines 8 and 9 leading to the wheel brakes 10 and 11, respectively. Provided in the branch brake conduits 4 and 5 are electromagnetically actuated inlet valves 6 and 7 open in de-energized condition. Respectively one outlet conduit 12 and 13 leads from the cross point between the branch brake conduits 4 and 5 and the supply lines 8 and 9, respectively, to the low-pressure accumulator 16. Located in each of the outlet conduits 12 and 13 is respectively one electromagnetically actuated valve 14 and 15 closed in de-energized condition. The in-take conduit 17 leads from the low-pressure accumulator i6 to the in-take side of the pump 18 the pressure side of which, through the pressure conduit 19 and the check valve 20 blocking toward the pressure side of the pump, is in communication with the main brake conduit 3. The wheel brake 11, in the brake system as shown, is associated to a rear wheel while the wheel brake 10 is part of a front wheel. For this reason, the brake force controller 21 whose pressure reducing valve is open in deenergized condition and controlled by three pressures is provided in the supply line 9 leading to the wheel brake 11. In the opening direction, it is the pressure prevailing on the brake force controller which, viewed from the brake force controller, is the pressure on the master cylinder side that becomes effective, while in the closing direction the pressure on the wheel brake side becomes effective. Finally, in the opening direction, it is the pressure prevailing in the control conduit 22 that becomes additionally effective. That pressure originates from the pressure conduit 19 between the pressure side of the pump 18 and the check valve 20 so that it is always only the pressure generated by the pump that places the brake force controller in its opening position while the control conduit is left unaffected by the pressure of the master cylinder.

Consequently, the brake force controller 21 operates as follows:

As long as the pump 18 is inoperative, i.e. as long as the brake slip values do not exceed a predetermined critical value, the operation of the brake force controller 21 corresponds to the one of any conventional brake system. If the brake pressure supplied to the wheel brake 11 exceeds a predetermined switch-over pressure, the pressure reducing valve of the brake force controller 21 closes and each additional pressure increase on the master cylinder side passed to the wheel brake is reduced. That function is conventional wisdom.

However, once the brake slip on one of the wheel brakes 10 or 11 exceeds a critical threshold Jeopardizig the driving stability, the pump 18 starts to operate, delivering from the low-pressure accumulator 16 loaded by actuating the outlet valves 14 and 15, respectively. This way of control is also taught by the state of art. While the pump 18 delivers pressure fluid through the pressure conduit 19 to the master brake conduit 3 a control pressure is building up in the control conduit 22 preventing the brake force controller from carrying out its brake pressure reducing function. The brake pressure control is immediately effected exclusively through the electromagnetically actuated control valves, i.e. through the inlet valves 6 and 7 and the outlet valves 14 and 15.

Thanks to that circuit configuration the brake force controller 21 is actuated whenever a decalstation step exceeds the switch-over pressure of the brake force controller 21. Jamming of the pistons and other defectiveconditions due to a standstill over extended periods of time are thereby eliminated. Conversely, the anti-.locking function of the brake system is not needed so frequently as it would be had no brake force controller been provided because the brake slip of the rear wheels is maintained by the brake force controller 21 largely within the permitted range.

The design of a brake force controller of this type is shown, for example, by FIGS. 2 and 3.

In the brake force controller as shown in FIG. 2, inlet 30 and outlet 31 are arranged in coaxial relationship. The connection for inlet 30 which, in the circuit, is facing the master brake cylinder, is provided with an outer thread. Provided on outlet 31 facing the wheel brake is an internal thread, thereby preventing a confusion of the two connections from occurring. Arranged in radial relationship to the axle between inlet 30 and outlet 31 is the control connection 32 which is in communication with the pressure side of the pump, with the casing of the controller substantially being formed of three parts. The inlet 30 is moulded to the casing sleeve 33 whereas the outlet 31 is formed on the casing body 34. Casing body 34 and casing sleeve 33 are substantially of a rotation-symmetrical configuration. The control connection 32 is provided on the connection ring 35 pushed onto the casing body 34. Thehousing body 34 toward the outlet 31 is provided with a positioning aid in the form of a one-step expansions with the casing body 34 protruding through the connection 35. The casing sleeve 33 is pushed onto the said end of the casing body 34 protruding through the connection ring 35 and is in caulked relationship with the casing body 34 such that also the connection ring 35 is fixed by the casing sleeve 33.

The casing sleeve 33 is provided with an inlet bore 36 extending from the inlet 30 into the casing interior in which inlet bore is sealingly guided the thinner end of a control piston 37. The end of the control piston 37 on the inlet side is configured as a valve seat 38, The said valve seat 38 cooperates with a valve closing member 39 which is provided on the inlet side of the control piston 37 and is forced by a centering element 40 to which pressure is applied by a valve spring 41 toward the control piston, against plunger 42 passing through the axial bore 43' of the control piston 37.

The inlet bore 36 expands toward a chamber 43 containing no pressure fluid; arranged within the said chamber is a control spring 44 applying pressure to the control piston 37 through an annular disc 45 in tae opening direction of the valve 38, 39. The thicker end of the control piston 37 is sealingly guided within the guiding sleeve 46. The latter is in caulked relationship within the casing sleeve 33. It contains an axial opening 47 through which plunger 42 protrudes. The end of the plunger 42 protruding through the guiding sleeve 46 is in abutment with the front side 50 of the blocking piston 48 facing the control piston 37 and is moved along therewith. The resting position of the blocking piston 48 on a step of the casing body 34 on the outlet side is determined by the reset spring 49 provided between the guiding sleeve 46 and the blocking piston 48. The front sides 50 and 51 of the blocking piston 48 are interconnected by a passage bore 52. The said passage bore 52 is guided in oblique relationship through the blocking piston 48 such that it centrally exits out of the blocking piston 48 at the outlet side yet decentrally terminating on the front side 50 facing the control piston, thereby preventing the plunger 42 from passing into the passage bore 52.

The blocking piston 48 is also of a stepped configuration, with the major and minor circumferences being respectively sealed against the wall of the casing body 34. Provided between the sealants of the blocking piston 48 is the annular control chamber 53 in communication with the control connection 32. For that purpose, the control chamber 53 is provided with a connecting bore 54 leading to the peripheral annular groove 55 located circumferentially of the casing member 34 within the axial section in whichis contained the control connection 32. As the blocking piston 48 has its section of larger diameter on the side of the control piston and its section of smaller diameter on the outlet side, a pressure build-up above the control connection 32 exerts a force on the blocking piston 48 toward the control piston. This means that once the compressire force of the reset spring 49 is exceeded the blocking piston 48 is displaced toward the control piston 37 so that the plunger 42 displaces the valve closing member 39 toward the inlet 30. With the stroke of the control piston 37 toward the inlet 30 limited through the step 56 a lock is attained in this way preventing the valve seat 38 from abutting the valve closure member 39.

Concerning FIG. 2 it should be noted that the positions of the control piston 37 and of the blocking piston 48 as shown correspond to a deceleration step in which although the switch-over pressure of the brake force control is exceeded no brake slip control is performed. With the brake not applied, the control piston 37 is moved back to the stop on the guiding sleeve 46. In case of a brake pressure build-up the control piston 37 displaces toward the inlet 30 as the operating face in the valve closing direction is larger than in the valve opening direction. Upon commencement of a brake slip control, a control pressure is built up above the control connection 32 thereby displacing the blocking piston 48 toward the control piston 37 so that the valve closing member 39 is passed to a position outside the range of the valve seat 38.

The principle underlying the brake force controller according to FIG. 3 is identical with the one of FIG. 2 except for the coaxial arrangement of the inlet 30 and the control connection 32, while the outlet 31 extends in radial relationship to the two other connections. The upper section of FIG. 3 down to the bottom edge of the control piston 37 is identical with the one of FIG. 2. The bottom section differs from FIG. 3 by the design of the guiding sleeve 46 rigidly secured to the casing, by the integral formation of the radial connection and the casing body 34, by the arrangement of the reset spring 49 and by the shaping of the blocking piston 48' and 48".

The blocking piston in this case is of a bipartite configuration, with the blocking piston section 48' facing the control connection 32 being of a larger diameter than the adjoining blocking piston section 48". The latter in this instance is sealingly guided in the extended guiding sleeve 46. The reset spring 49 is arranged within the guiding sleeve 46, supporting itself, with the end on the inlet side, on an internal step 57 of the guiding sleeve 46.

The guiding sleeve 46 within its central opening 47 through which the plunger 42 protrudes, includes radial channels 58 interconnecting the interior of the guiding sleeve 46 with the outlet 31. The annular chamber 59 confined by the thicker blocking piston section 48' on the one hand and by the guiding sleeve 46 with the thinner blocking piston section 48" on the other hand, does not contain any pressure fluid and is provided with a radial connection 50 toward the atmosphere which is protected by the sealing ring 61 against the ingress of dirt.

We claim:

1. An anti-locking hydraulic brake system, comprising:

a pedal-operated master brake cylinder in communication with a first pressure fluid reservoir, a brake conduit leading to at least one brake of a rear wheel, an outlet conduit leading from the at least one brake of a rear wheel to a second pressure fluid reservoir, a connection between the brake conduit and the at least one brake of a rear wheel and a connection between the outlet conduit and the at least one brake of a rear wheel being made in form of acommomn supply line, a pump for delivering pressure fluid from the second pressure fluid reservoir into the brake conduit, an electromagnetically actuated inlet valve provided in the brake conduit, an electromagnetically actuated outlet valve provided in the outlet conduit, and a brake force controller provided in the supply line, said brake force controller having an input and an output and an only control input and performing a pressure reducing function in an inoperative mode of the pump, the pressure reducing function of the brake force controller being rendered inoperative by means of a blocking device therein when the blocking device is hydraulically actuated through the only control input by the discharge pressure of the pump.

2. An anti-locking hydraulic brake system according to claim 1, wherein the brake force controller is located between the wheel brake and the inlet and outlet valves.

3. An anti-locking hydraulic brake system according to claim 1 wherein the brake force controller is of the in-screw type having three pressure fluid connections two of which are in coaxial relationship.

4. An anti-locking hydraulic brake system according to claim 1, wherein the blocking device is a blocking piston which moves a valve closing member and to which the discharge pressure of the pump is applied in the opening direction of the valve, while, in the closing direction of the valve, the force of a reset spring and the pressure in the wheel brake are applied thereto.

* * * * *